United States Patent [19]
Morse et al.

[11] 3,764,211
[45] Oct. 9, 1973

[54] DISPLAY SYSTEM CAPABLE OF SELECTIVE ANNOTATION

[75] Inventors: John Edwin Morse, Penfield; Claire Llewellyn James, Pittsford, both of N.Y.

[73] Assignee: Eastman Kodak Company, Rochester, N.Y.

[22] Filed: Aug. 25, 1972

[21] Appl. No.: 283,891

[52] U.S. Cl. ............ 355/71, 250/213 R, 355/20, 355/52
[51] Int. Cl. .......................... G03b 27/76
[58] Field of Search .......... 355/20, 52, 71, 80; 350/160 LC; 250/213 R; 353/20, 21

[56] References Cited
UNITED STATES PATENTS

| 3,576,364 | 4/1971 | Zanoni | 350/160 LC |
| 3,592,527 | 7/1971 | Conners | 350/160 LC |
| 3,410,999 | 11/1968 | Fergason | 350/160 LC |

*Primary Examiner*—Monroe H. Hayes
*Attorney*—W. H. J. Kline et al.

[57] ABSTRACT

A display system for information, the system having a photoconductor-liquid crystal sandwich image storage device for receiving an initial piece of information and being capable of selective annotation. The annotation may be accomplished by utilizing a source of imaging radiation independent of the radiation source used for imaging the initial piece of information so as to superimpose an additional image signal to the initial piece of information or, alternatively, activating a segment of the photoconductor-liquid crystal sandwich to alter the portion of the image in that particular segment.

7 Claims, 3 Drawing Figures

DISPLAY SYSTEM CAPABLE OF SELECTIVE ANNOTATION

CROSS REFERENCE TO RELATED APPLICATIONS

Reference is made to commonly assigned copending U.S. application Ser. No. 81,959 filed Oct. 19, 1970 entitled METHOD AND APPARATUS FOR CONTRAST REDUCING to John E. Morse and 81,960 filed Oct. 19, 1970 entitled MASKING PRINTER to Edward K. Letzer.

BACKGROUND OF THE INVENTION

1. Field of the Invention

This invention relates to display systems and more particularly to information display systems utilizing photoconductor-liquid crystal sandwich intermediate image storage devices having the capability of being selectively annotated.

2. Description of the Prior Art

The field of visual display has recently seen marked advance due primarily to the technological developments with regard to the use of liquid crystals. Liquid crystals are substances which, within a particular temperature range, can attain a mesomorphic state between an isotropic liquid and a solid crystal. Liquid crystals have been known since the late 1800's and it was recognized very early that these substances display rheological properties similar to that of fluids while exhibiting optical properties similar to that of materials in the crystalline state. However, it has only been within the last decade that practical use of the liquid crystal for image storage and display has been attained.

In July 1968 in the "Proceedings of the IEEE," an article entitled "Dynamic Scattering: A New Electro-Optical Effect In Certain Classes of Nematic Liquid Crystals" by Heilmeier, Zanoni and Barton, at pp. 1162-1171, noted that when a d.c. electric field is placed across a nematic liquid crystal, the molecules thereof become disoriented so that the material diffuses light and becomes milky white in appearance. When the field is removed, the molecules of the liquid crystal return to their previous orientation so that the liquid is again transparent. In an article entitled "A New Electric Field Controlled Reflective Optical Storage Effect In Mixed Liquid Crystal Systems" by Heilmeier and Goldmacher in the Aug. 15, 1968 "Applied Physics Letters" at pp 132 and 133, there was described a liquid crystal system which was comprised of a mixture of nematic liquid crystal substance and a cholesteric liquid crystals substance. The described system exhibited the property of changing from initially transparent to a milky white light diffusing condition upon the application of a d.c. or low frequency a.c. electrical field; however, on the removal of the field, the liquid crystal remained in the light diffusing state and maintained this condition until erased or changed back to the transparent state by application of a high frequency a.c. signal.

In U.S. Pat. Nos. 3,592,527 and 3,627,408 and in U.S. Pat. application Ser. No. 81,959 and No. 81,960 as well as at pages 51-53 of the July 15, 1970 edition of "Applied Physics Letters" in an article entitled "Reversible Ultraviolet Imaging With Liquid Crystals" by J. S. Margerum, J. Nimoy and S. Y. Wong, a further advancement in the use of liquid crystal materials was described. The liquid crystal substance was used in combination with a photoconductor material. A sandwich was formed of a first transparent electrode, a layer of photoconductor material, a layer of liquid crystal material and a second transparent electrode. An electric field applied across the electrodes and a light radiation pattern desired to be displayed was projected onto the photoconductor material through the first electrode rendering the photoconductor material conductive in the areas exposed to the radiation pattern. The conductivity pattern in the photoconductor material permitted a current flow between the electrodes which generated a change in the degree of transparency of the liquid crystal layer to form an image corresponding to the radiation pattern striking the photoconductor material. The image formed in a liquid crystal layer could then be viewed through the second electrode by ambient or artificial light reflected from a specular mosaic or an opaque coating between the photoconductor layer and the liquid crystal layer (as described in the aforementioned patents) or by projection of the image by a light source through the photoconductor-liquid crystal sandwich (as described in the aforementioned U.S. patent applications).

With the use of the above-described principles, it is possible in many different applications to provide for the storage of an erasable image which may be displayed for use in some manner according to the particular end result desired. If, however, the image is in some way defective or needs to be updated before final display or projection, it has been necessary to completely erase the image and reimage the photoconductor-liquid crystal sandwich with the proper desired image.

SUMMARY OF THE INVENTION

In view of the foregoing, it is an object of this invention to provide a system for displaying information, the system having the capability of being selectively annotated.

A further object is to provide an information display system having an erasable image storage device for receiving an initial piece of information, the storage device being capable of having selective changes made in the image stored therein.

In accordance with the above objects there is herein provided a system for information display, the display system having a photoconductor-liquid crystal sandwich image storing device for receiving an initial piece of information and being capable of selective annotation. The annotation may be accomplished by utilizing a source of imaging radiation independent of the source for imaging the initial piece of information on the image storage device to superimpose an additional signal onto the initial piece of information, or alternatively, activating a segment of the photoconductor-liquid crystal sandwich to alter the portion of the image in that segment.

DESCRIPTION OF THE PREFERRED EMBODIMENT

Figure 1:
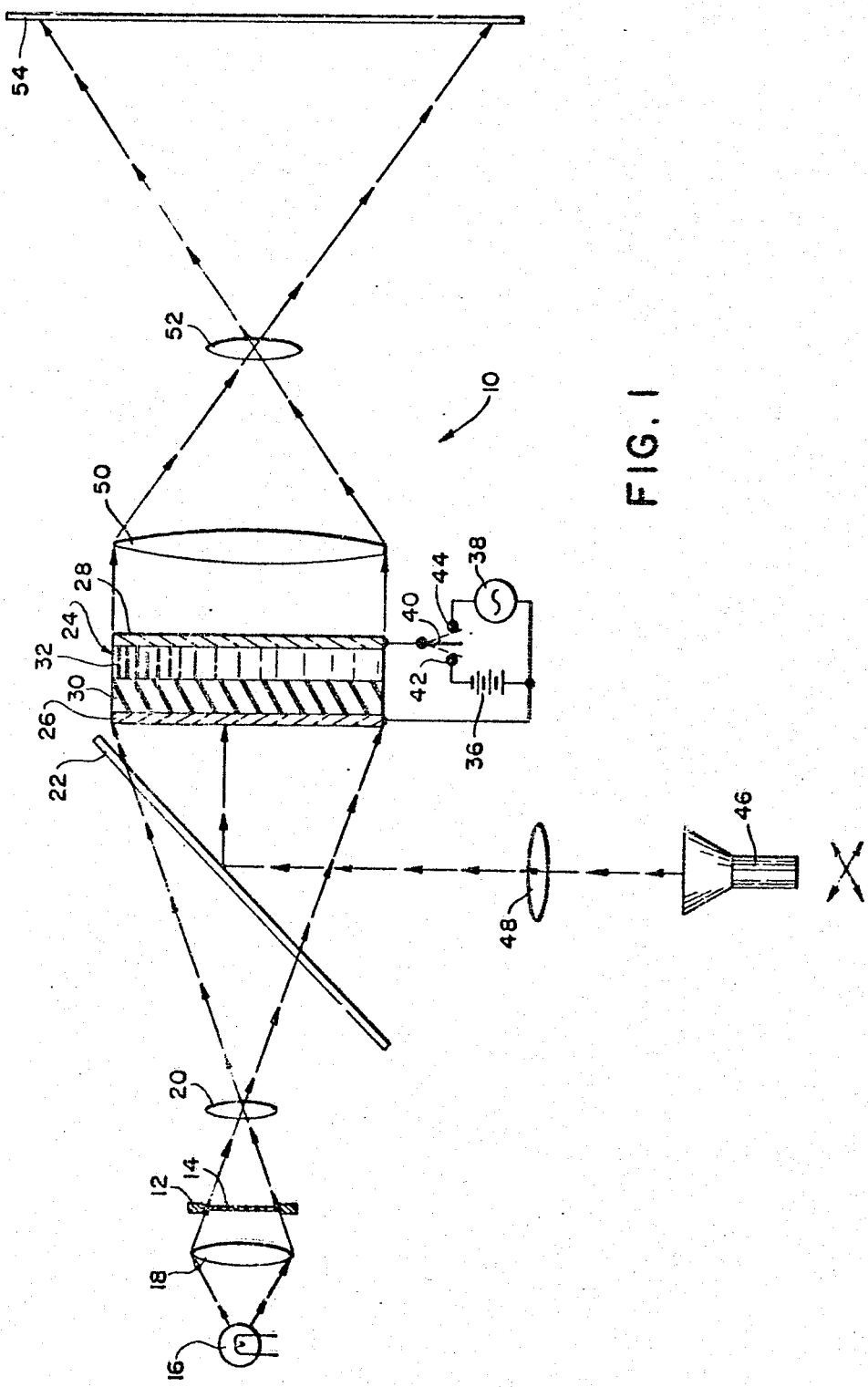
FIG. 1 is a schematic view of the information display system of this invention utilizing an independent radiation source for annotation of the image stored in the photoconductor-liquid crystal sandwich.

Referring now to the drawings, FIG. 1 shows one embodiment of an information display system 10 having a mounting means, such as a transparency holder 12 for holding a transparency 14 containing an initial piece of information desired to be displayed. The mounting means 12 is positioned in the projection path of a projecting lamp 16 which has a condenser lens 18 for directing the illuminating radiation of the lamp 16 through the transparency 14, relay objective 20 and movable mirror or beam splitter 22 so as to project a radiation pattern representative of the image in the transparency 14 onto an image storage device such as the photoconductor-liquid crystal sandwich 24. The photoconductor-liquid crystal sandwich 24 is fully described in aforementioned U.S. Pat. application Ser. No. 81,959 and 81,960 and is described herein only in such detail so as to permit a complete understanding of this invention.

The photoconductor-liquid crystal sandwich 24 is comprised of a first transparent electrode 26 and a second transparent electrode 28, between which, in contiguous relationship, there is a layer of transparent photoconductor material 30 and liquid crystal material 32. The liquid crystal material 32 is comprised of a mixture of nematic liquid crystal substance and cholesteric liquid crystal substance in order to enable the sandwich 24 to be used in a storage mode in a manner to be explained hereinbelow. Connected to the transparent electrode 26 through an appropriate conductor is a d.c. potential source 36 and an a.c. potential source 38. A switch 40 is connected to the transparent electrode 28, the switch 40 being positionable to a neutral position or to contact terminals 42 or 44, the terminals 42 and 44 being connected respectively to the d.c. potential 36 and the a.c. potential 38.

When the image of the piece of information such as transparency 14 is projected onto the photoconductor-liquid crystal sandwich 24 the switch 40 is moved to contact terminal 42 to permit application of a d.c. potential from the d.c. potential source 36 across the electrodes 26 and 28. The radiation pattern representative of the image of the transparency 14 will strike the photoconductor material 30 and cause the material to become conductive in a pattern corresponding to the imposed radiation pattern. The increased conductivity will result in a corresponding current flow through the liquid crystal material 32 causing the material to become diffuse in a pattern representative of the imposed image pattern. The switch 40 may then be placed in its intermediate neutral position in which no potential is applied between the electrodes 26 and 28 and because of the storage nature of the particular liquid crystal material mixture the diffuse image formed therein will remain.

Annotation of the image of the slide 14 formed in the sandwich 24 is accomplished by independent movable radiation source 46 which may be a cathode ray tube, laser source, or some similar radiation signal device to which the sandwich 24 is sensitive. The beam thereof is transmitted through the relay lens 48 onto the mirror 22 where it is redirected to the area of the sandwich 24 in which annotation is desired. The switch 40 will be repositioned to contact terminal 42 so that the d.c. potential is again applied across the electrodes 26 and 28. Thus, when radiation from the source 46 strikes the photoconductor material 30, the material will become conductive in that area to effect a positive change in the current flowing in the corresponding area of the liquid crystal material 32 to locally add diffuse areas to the image stored therein. The diffuse image originally formed on the liquid crystal material 32 is not affected by the reapplication of the d.c. potential and is only affected to the extent of the annotation by the independent radiation source 46.

When annotation is completed, the independent source 46 will be turned off, switch 40 will be placed once again in its intermediate position and the projection lamp 16 may be turned on (slide 14 being removed from the optical path) to project the annotated image in the photoconductor-liquid crystal sandwich image storage device 24 through the field lens 50 and objective lens 52 onto a receiving station such as a viewing screen 54. After the projection of the annotated image for any desired purpose, the switch 40 may be moved from its intermediate position to contact terminal 44 in order to apply the a.c. potential from the source 38 across the electrodes 26 and 28 to erase the image stored in the liquid crystal material 32 to clear the material and prepare the sandwich 24 for receiving a new initial piece of information to be displayed.

Figure 2:
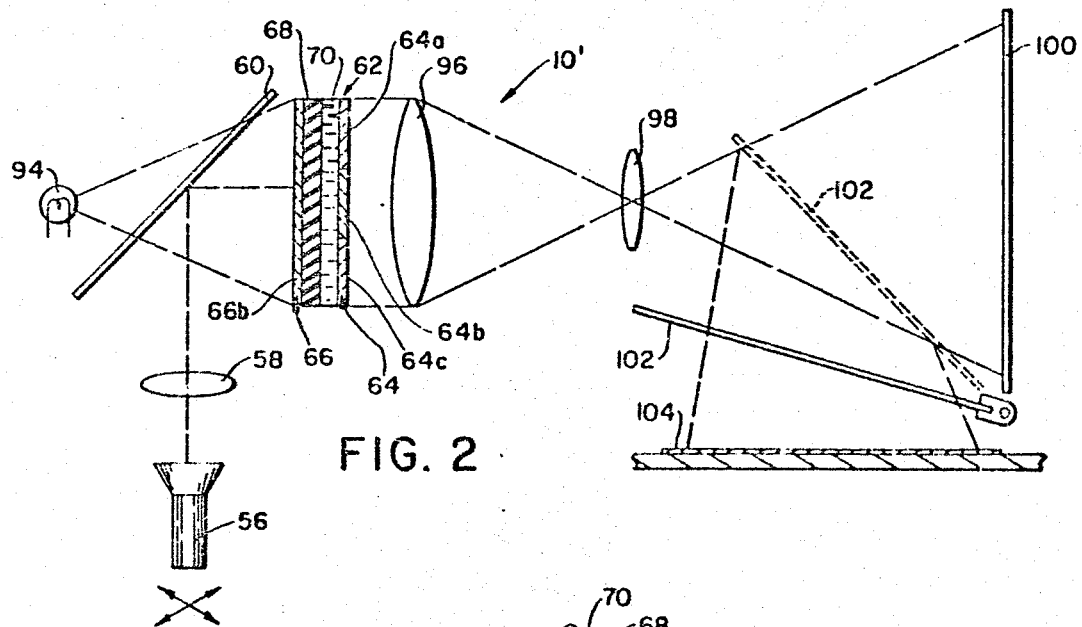
FIG. 2 is a schematic view of an alternative embodiment of the information display system according to this invention utilizing a segmented photoconductor-liquid crystal sandwich image stored device.

FIG. 2 shows a second embodiment of an information display system 10' according to this invention. In the system 10', a movable radiation source 56 emits a radiation beam which is transmitted by means of the relay lens 58 and dichroic mirror 60 onto an image storage device such as the photoconductor-liquid crystal sandwich 62. As with the radiation source 46 of FIG. 1, the radiation source 56 may be a cathode ray tube, a laser source, or any other beam emitting radiation source to which the photoconductor-liquid crystal sandwich 62 is sensitive. The dichroic mirror 60 may, in a manner similar to mirror 22, be a movable mirror or any type reflective device which may be selectively removed from the optical path.

Figure 3:
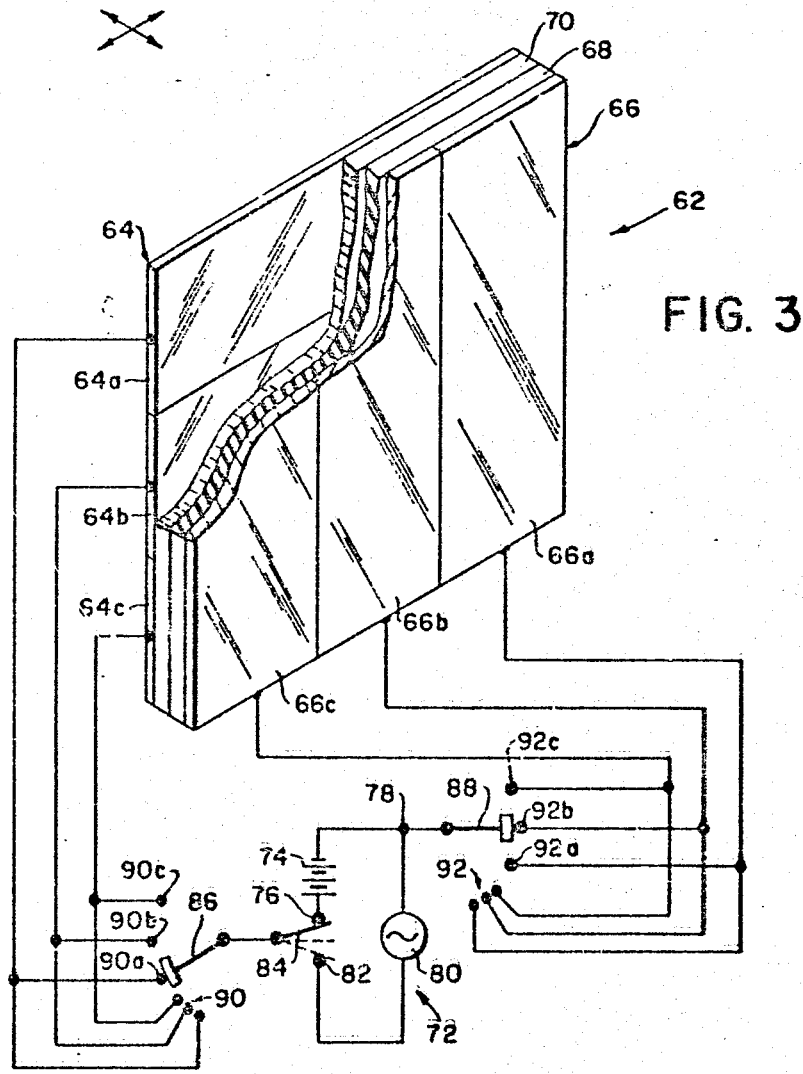
FIG. 3 is a perspective view with a portion broken away of the segmented photoconductor-liquid crystal sandwich image storage device of FIG. 2, the potential supply and switch means therefor being schematically shown.

The photoconductor-liquid crystal sandwich 62 operates in the same manner as the sandwich 24 of the arrangement 10 of FIG. 1 but differs in construction (see FIG. 3) so that the function of annotation is somewhat different. In contruction of the sandwich 62, transparent electrodes 64 and 66 are segmented into elements 64a, 64b, 64c and 66a, 66b, 66c respectively with the segments of one electrode being transversely oriented to segments of the other electrode. The photoconductor material 68 and the liquid crystal material 70 are placed as unitary layers in contiguous relationship between the transparent electrodes 64, 66.

In order to selectively supply a potential across the transparent electrodes 64 and 66, a power supply arrangement 72 is provided. The power supply arrangement 72 includes a d.c. potential source 74 connected between terminals 76 and 78, and an a.c. potential source 80 connected between terminals 82 and 78. A potential selection switch 84 is provided to selectively contact terminals 76 or 82 to select either the d.c. or a.c. potential source for application across the transparent electrodes 64 and 66. In order to provide application of the selected potential source across particular areas of the photoconductor-liquid crystal sandwich 62, segment selector switches 86 and 88 are included in the power supply arrangement 72. The switch 86 may be selectively positioned to contact tri-terminal 90 or terminals 90a, 90b or 90c. The tri-terminal 90 permits power to be supplied to the entire surface of the transparent electrode 64 while terminals 90a, 90b and 90c are respectively connected to the transparent electrode segments 64a, 64b and 64 c. In a similar manner, the switch 88 may be selectively positioned to contact tri-terminal 92 or terminals 92a, 92b or 92c. The tri-terminal 92 permits power to be supplied to the entire transparent electrode 66 while terminals 92a, 92b and 92c are connected to the transparent electrode segments 66a, 66b and 66c respectively.

By directing switches 86 and 88 to particular terminals, the desired area of the sandwich 62 to be activated may be selected. As illustratively shown in FIG. 3, the switch 86 is positioned to contact terminal 90a while the switch 88 is positioned to contact terminal 92b. With the potential selection switch 84 contacting terminal 76 to permit application of a d.c. potential from source 74, the shown positioning of switches 86 and 88 will connect the d.c. potential to transparent electrode segments 64a and 66b. Since the upper center portion of the sandwich 62 is the only area in which the electrode segments 64a and 66b overlap, a potential may exist across the electrodes 64 and 66 only in this area; thus, this area will be activated while all other areas of the sandwich 62 will remain in the condition prior to application of the potential. That is to say, any image stored in the sandwich 62 will retain its appearance except for the upper center area of the sandwich which may be annotated or reimaged (by first application of the erasing a.c. potential and then application of the d.c. potential) to any particular desired configuration. It is of course understood that the number of segments for the transparent electrodes 64 and 66 is dependent only upon the desired capability of annotation of the sandwich 62 and is no way limited to the specific configuration shown in FIG. 3.

As is the procedure with regard to the embodiment of FIG. 1, an initial piece of information is placed on the sandwich 62. This is accomplished by positioning the segment selector switches 86 and 88 to contact tri-terminals 90 and 92 respectively to permit a selected potential to be applied across the entire area of the electrodes 64, 66. The potential selection switch 84 is positioned to contact terminal 76 to apply a d.c. potential from d.c. potential source 74 across the electrodes 64, 66. A radiation pattern representative of the initial piece of information may then be projected onto the sandwich 62 by the movable radiation source 56 to form a corresponding image on the sandwich 62 representative of the desired initial piece of information. With the initial piece of information thus formed, the switch 84 is moved to its neutral position to cease application of the potential across the electrodes 64, 66 and because of the composition of the liquid crystal the image will be stored therein. Annotation may then be accomplished by activating any desired area of the sandwich 62 with a d.c. potential in the manner described above and reforming the recorded radiation pattern in that area by applying the radiation source 56 to add to or completely reimage the information contained in the specified area.

After the initial piece of information has been formed on the photoconductor-liquid crystal sandwich 62 by the movable radiation source 56 and any annotation necessary thereto has been accomplished, the switch 84 will be moved to an intermediate position between terminals 76 and 82 so that potential supply between the electrodes 64 and 66 will be removed. As noted above, the liquid crystal material 68 is of a storage mix composition which will retain the image formed in the liquid crystal layer until an a.c. potential is applied thereacross to erase the formed image. The image stored within the sandwich 62 may be projected by a projection lamp 94 which is directed through the dichroic mirror 60 and the sandwich 62 to a field lens 96 and an objective lens 98 so as to form an image representative of the annotated image stored in the sandwich 62 on a screen 100. It is understood that if the lamp 94 is to remain on, when a dichroic mirror is used the radiation emitted by lamp 94 cannot be within the sensitivity range of the image storage device 62; however, when a movable mirror is used the radiation from lamp 94 may be within the sensitivity range of the device 62.

The annotated image received at the screen 100 may be observed for any particular purpose or may be selectively printed by moving a movable mirror 102 into the projection path (as shown in broken lines) so as to reflect the formed image onto a print platen 104 for printing in any particular manner (not forming part of this invention). It is of course understood that the printing of the projected image could similarly be accomplished in the embodiment of FIG. 1. After viewing or printing is completed, the switch 84 may be positioned to contact terminal 82 and switches 86 and 88 positioned to contact triterminals 90 and 92 respectively so that the erasing a.c. potential from the potential source 80 may be applied across the entire electrodes 64 and 66 to return the liquid crystal material 68 to its clear state to ready the sandwich 62 to receive any desired new piece of information.

From the foregoing, it is readily apparent that there is herein provided a novel display system for presenting information, the display system having the capability of being selectively annotated to correct or update the information to be displayed. The display system has a photoconductor-liquid crystal sandwich image storage device for receiving an initial piece of information. The annotation may be accomplished by utilizing a source of imaging radiation independent from the source for imaging the initial piece of information on the sandwich to superimpose an additional image signal to the initial piece of information; or in an alternative embodiment, activating a segment of the photoconductor-liquid crystal sandwich to alter the portion of the image in that segment.

The invention has been described in detail with reference to preferred embodiments thereof, but it will be understood that variations and modifications can be effected within the spirit and scope of the invention.

We claim:
1. An informational display system comprising:
an image storage device for recording and storing an image pattern of an initial piece of information, said image storage device including a photoconductor-liquid crystal sandwich and means to apply a potential across said sandwich in order to permit said sandwich to record the image therein;
means for projecting an image radiation pattern of an initial piece of information onto said image storage device;

means for activating said potential across said photoconductor-liquid crystal sandwich to store said image of said initial piece of information therein;

means for altering at least a portion of said image of said initial piece of information stored on said image storage device; and means for transmitting said altered stored image from said image storage device to a receiving station.

2. The apparatus of claim 1 wherein said initial piece of information is a transparency and wherein said means for projecting said image of said initial piece of information comprises a transparency holder for supporting said transparency, a projection radiation source to which the image storage device is responsive, a condenser lens between said projection radiation source and said transparency for directing radiation from said source through said transparency, a relay objective between said transparency holder and said image storage device for directing the radiation through said transparency to said image storage device in a radiation pattern representative of the image of said transparency.

3. The apparatus of claim 2 wherein said means for altering at least a portion of said image of said initial piece of information stored on said image storage device includes a second source of radiation to which the image storage device is responsive and means for selectively directing radiation from said second source onto said image storage device to alter the image stored therein.

4. The apparatus of claim 1 wherein said means for projecting said image of said initial piece of information is a source of radiation to which said image storage device is responsive and means for directing radiation from said source onto said image storage device in a pattern representative of said initial piece of information.

5. The apparatus of claim 4 wherein said means for altering at least a portion of said image of said initial piece of information stored on said image storage device includes means for selectively activating a portion of said image storage device so that radiation directed onto said image storage device will affect only that portion selectively activated.

6. The apparatus of claim 4 wherein said photoconductor-liquid crystal sandwich includes a segmented first transparent electrode, a layer of photoconductor material in continuous relationship with said first electrode, a layer of liquid crystal material in contiguous relationship with said layer of photoconductor material, and a segmented second transparent electrode in contiguous relationship with said layer of liquid crystal material, the segments of said second transparent electrode being transversely oriented to said segments of said first transparent electrode.

7. The apparatus of claim 6 wherein said means to apply a potential across said sandwich includes an a.c. potential source connected to a first and second terminal, a d.c. potential source connected to said first terminal and a third terminal, a potential selection switch being selectively positionable to contact said second terminal or said third terminal to select either the a.c. potential or d.c. potential respectively or an intermediate neutral position, a first segment selector switch means for connecting said first terminal to a desired segment of said first transparent electrode, and a second segment selector switch means connecting said potential selection switch to a desired segment of said second transparent electrode.

* * * * *